UNITED STATES PATENT OFFICE.

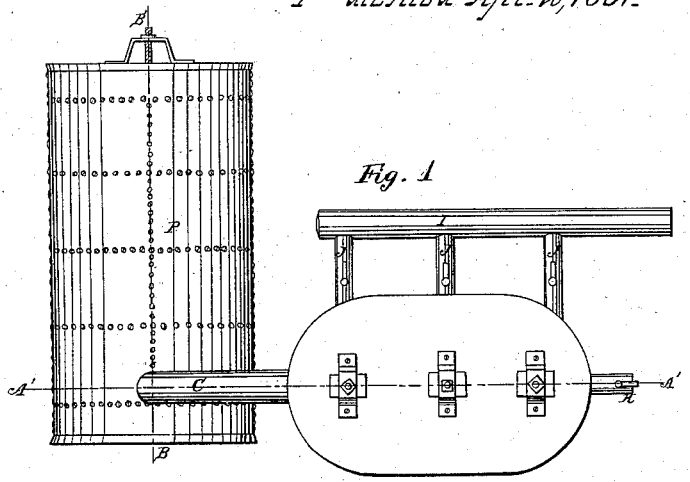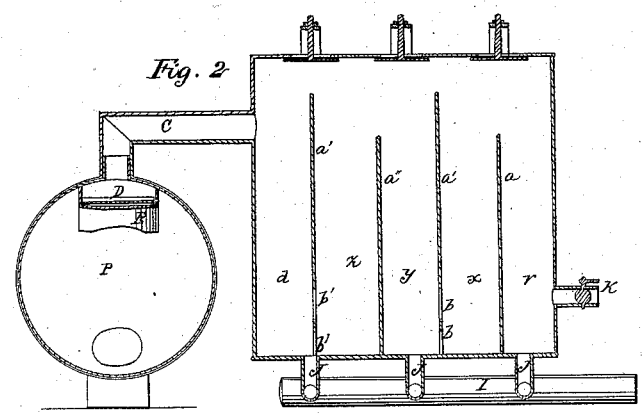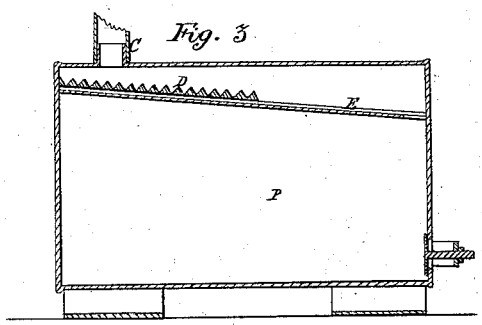

T. JACOBS AND N. J. WILKINSON, OF ST. LOUIS, MISSOURI.

APPARATUS FOR PURIFYING WATER.

Specification of Letters Patent No. 31,891, dated April 2, 1861.

*To all whom it may concern:*

Be it known that we, T. JACOBS and N. J. WILKINSON, of the city of St. Louis and State of Missouri, have invented a new and Improved Water-Clarifier; and we do hereby declare that the following is a full, clear, and exact description of the same, reference being had to the annexed drawing, making part of this specification, in which—

Figure 1 is a top view, Fig. 2 a vertical section on the line A' A', and Fig. 3 is a vertical section on the line B' B'.

The following description of our invention will enable anyone skilled in the art to which it appertains to make and use the same.

Similar letters of reference represent corresponding parts of the drawing annexed.

In the drawing A represents a water tank, which is divided by partitions shown by $a'$ $a'$ $a''$ $a$. The partitions, $a'$ $a'$ are higher, than the partitions, $a''$ $a$, and they are also made with openings at, and near the bottoms thereof as shown by $b'$ $b'$, $b$ $b$. At or near the top of the said tank a pipe is located, shown by C which pipe leads to the boiler P, in the upper part of which a pan F is hung upon an oblique plane in the manner shown. In this pan, which is open at the lower end, a corrugated plate D is placed, which may be removed at pleasure.

The operation of this apparatus is as follows. The water is pumped in the tank through the pipe K in which a check valve is located, to regulate the operation of the pump, in the ordinary manner. The water first fills the chamber $v$, then runs over the top of the partition $(a)$ into the chamber $(x,)$ then through the openings $(b\ b,)$ in the chamber $(y,)$ then over the partition $(a'')$ into the chamber $(z,)$ then through the holes $(b'\ b')$ in the chamber $(d,)$ from whence it is forced into the boiler (P) by the action of the force pump. Now if the water contains dirt or sediment of any kind, heavier than water, it will settle in the bottom of the chambers as it passes from one to the other which would thus leave the water in the upper part of the tank clear. This it will be seen must result from the arrangement of the partitions in the tank, for the sediment, before it can get from the chamber $v$ into the chamber $x$, must pass over the partition $a$; and it cannot get from the chamber $x$ into the chamber $y$, until it falls to the bottom, of the chamber $x$. Now the sediment being heavier than the water, after it has once fallen to the bottom of the tank, will not rise again, unless it be stirred, or washed by a rapid current, which the partitions are put in the tanks to avoid. If, notwithstanding the partitions in the tanks, some of the sediment should rise to the top, it will be gathered on the corrugated plate D, placed under the delivery end of the pipe C, for that purpose, which plate may be taken out and cleaned at pleasure.

From the bottom of the tank, there are a number of blow pipes J, leading to a main blow pipe I, through which the mud, or sediment, is blown from the tank.

Having thus described the construction and operation of our invention, what we claim, and desire to secure by Letters Patent, is—

Arranging the corrugated plate or collector D, in connection with the feed pipe, and within the boiler as described, for the purpose of cleansing the feed water before it mingles with that in the boiler and after it has passed through the purifier, in the manner described herein.

T. JACOBS.
N. J. WILKINSON.

Witnesses:
AMOS BROADNAX,
WILLIAM JACOBUS.